United States Patent [19]

Greenwald et al.

[11] 3,944,513

[45] Mar. 16, 1976

[54] PURIFICATION OF POLYMER DISPERSIONS WITH ADSORBENT CARBON PARTICLES

[75] Inventors: Harold L. Greenwald, Jenkintown; Benjamin B. Kine, Elkins Park, both of Pa.

[73] Assignee: Rohm and Haas Company, Philadelphia, Pa.

[22] Filed: Apr. 3, 1974

[21] Appl. No.: 457,326

Related U.S. Application Data

[62] Division of Ser. No. 820,305, April 29, 1969, abandoned.

[52] U.S. Cl. ................ 260/29.6 PT; 260/29.6 TA; 260/29.6 H; 260/29.6 R; 260/78.5 E; 260/86.1 E; 260/80.73; 260/80.8; 423/461
[51] Int. Cl.² C08L 33/02; C08L 33/08; C08L 33/10
[58] Field of Search. 260/29.6 PT, 29.6 R, 29.6 TA, 260/96 R; 210/24

[56] References Cited

UNITED STATES PATENTS

| | | | |
|---|---|---|---|
| 2,810,714 | 10/1957 | Price | 260/96 R |
| 3,502,638 | 3/1970 | Ratzsch et al. | 260/96 R |
| 3,505,263 | 4/1970 | Roth | 260/29.6 PT |

*Primary Examiner*—Harold D. Anderson

[57] ABSTRACT

Aqueous dispersions of particulate vinyl polymers, such as acrylic polymers, particularly those prepared by emulsion polymerization, which undesirably may be caused to coagulate or agglomerate to form larger particles when subjected to purification procedures, and which contain contaminants in the aqueous and polymeric phases, are purified and deodorized by contact with adsorbent carbon particles, such as petroleum coke, at a temperature above the $T_g$ of the dispersed polymer particles.

10 Claims, No Drawings

PURIFICATION OF POLYMER DISPERSIONS WITH ADSORBENT CARBON PARTICLES

This is a division of application Ser. No. 820,305 filed Apr. 29, 1969, now abandoned. This invention relates to the purification of aqueous dispersions of particulate vinyl polymers, such as acrylic polymers prepared by emulsion polymerization.

Aqueous dispersions of vinyl polymers often contain impurities, including volatile and nonvolatile materials which may impart undesirable properties to the polymer such as haze, color and odor, and detract from desirable properties such as strength, toughness, flexibility, water resistance and electrical properties. Such impurities may include unpolymerized monomers, initiators such as potassium persulfate, chain transfer agents such as mercaptans, emulsifiers, impurities introduced with these materials, and reaction products or degradation products thereof. The impurities may be in or on the polymeric particles, as well as in the aqueous phase. A number of methods having serious disadvantage are used or have been unsuccessfully attempted for purifying such dispersions of polymers. A simple, wholly satisfactory method has been sought for decades. Heating under a vacuum is used, but commonly foaming problems are encountered, as are an increase in particle size and gum formation. Sparging hot dispersions with air or nitrogen is sometimes used, but, with air, polymer oxidation and discoloration may occur, and again, foaming is likely. Steam distillation of impurities is useful if the polymer dispersion is stable at elevated temperatures, but this method is costly and may result in excessive dilution of the dispersion. Yet another method is the addition of a polymerization catalyst at the end of the polymerization step to polymerize residual monomer; care must be taken to prevent crosslinking and chain scission, however. Most of these methods increase the particle size of the dispersed particles and are relatively ineffective in removing odor bodies. Because most such latices or dispersions are susceptible to coagulation, many of these methods are not always successful.

Earlier attempts to purify such dispersions by contact with activated carbon have failed, possibly because of electrolytes present in the carbon or removal of emulsifiers and consequent coagulation, or for some other reason, but more likely because the discoveries of the present invention had not been made. Like other aqueous colloidal systems, water dispersions of vinyl polymers are susceptible to coagulation, and the art suggests that active carbon would coalesce or break such suspensions. J. W. Hassler, in "Active Carbon," p. 182, Chem. Publ. Co. (1951) cautions against contacting emulsions such as milk, butter, and mayonnaise with active carbon for the reason that such contact breaks the emulsions. A recent article in C and E News, pp. 66 and 67, Sept. 23, 1968, reports that a process has been devised for breaking oil-in-water or water-in-oil emulsions by passing them through a bed of carbon granules and metal particles. Synthetic macroreticular adsorbent resins have also been proposed, but few of such resins are useful, and they are relatively expensive, an example of a successful procedure utilizing particular macroreticular adsorbent resins appearing in Lannus application Ser. No. 571,734, filed Aug. 11, 1966.

An object of the present invention is to provide a method for the purification of aqueous dispersions of vinyl polymers while overcoming the disadvantages of prior proposed methods.

Another object of the invention is to provide such a method for beneficiating dispersions of solid particles of emulsion polymerized acrylic polymers.

An additional object of the invention is to utilize adsorbent carbon for accomplishing the other objects of the invention.

Yet another object of the invention is to provide a method for regenerating or revivifying the adsorbent carbon.

The manner of accomplishing these and other objectives of the invention is explained in the following portion of the specification.

Briefly, the invention includes the discovery that such aqueous dispersions of particulate vinyl polymers can be freed of impurities including odor producing and other volatile materials, without causing coagulation and with no change of particle size, by contacting the dispersion with active carbon particles if the dispersion is maintained at a temperature at or above the $T_g$ of the particles of dispersed polymer, and in the temperature range where the particles become rubbery, and, of course, if the impurities are preferentially adsorbed by the carbon. In some cases, it is preferred that the dispersion be maintained under superatmospheric pressure so that the pressure is in excess of the vapor pressure of volatile materials in the dispersion, that a protective colloid preferentially adsorbed on the polymer particles rather than the carbon be present, and that surface active materials be present. The expression "$T_g$" as used herein has the conventional meaning and is the temperature region where the particles transform from a glassy, hard form to a softer, more relaxed form. It is to be realized that the $T_g$ of the polymer particles, a critical condition in the present invention, is lower than that of the pure isolated polymer freed of impurities such as water and monomer, the dispersed particles in many cases being hydrated or swollen. The swelling of the dispersion particle can be controlled, within limits, by the pH, salt content and selected inoffensive solvent or plasticizer content of the system. These factors can then be used to decrease the $T_g$ of the dispersion particle in cases where this is desired. The $T_g$ varies with the identify of the polymer. It may be, for example, −40° C., 0° C., 10° C., 40° C., 60° C. or any other temperature inherent for a given polymer particle. In cases where the $T_g$ is 0° C. or lower, it may be desirable to cool the dispersion to near the freezing point to enhance stability of the dispersion. Normally, it is preferred to maintain the dispersion at well above the $T_g$. For example, for a $T_g$ of 10°, the dispersion is preferably maintained at a temperature of from 20° C. to 100° C., or higher if under pressure. For a further discussion of the glass transition temperature ($T_g$) of polymers reference is made to "Polymer Handbook," Brandrup and Immergut, Sec. III, pp. 61–63, Interscience, (1966).

The most surprising discovery of the present invention is that when the temperature of the dispersed particles is kept at least as high as the $T_g$ thereof, unreacted monomers and other materials which normally cause such undesirable properties as an odor unpleasant to some individuals, and which materials are contained in the solid polymer particles as well as monomers and other impurities emulsified or dissolved in the aqueous phase, are removeable by contact with solid particles of carbon without coagulation of the dispersion, and with no increase in particle size. The solubility of such materials in the particulate polymer is confirmed by the fact that when dispersions are analyzed, then dewatered and the aqueous phase analyzed, the values show that the polymer particles contain volatile impurities.

The aqueous dispersion of solid particles of a vinyl polymer, e.g., one prepared from monomers comprising those having the $CH_2=C<$ group, may be purified according to the invention. Although applicable to suspension polymers having relatively large solid beads, the process is of particular benefit for treating dispersions of solid polymers prepared by emulsion polymerization (sometimes called emulsion polymers or polymer latex), emulsified solution polymers, and especially those having a particle size of from 0.02 to 10 microns, and more preferably from 0.05 to 1.5 microns in size.

The adsorbent carbon particles must be of a size that they are separable from the polymer dispersion, whether the carbon is in the form of a fixed bed or a moving bed, or is simply slurried with the polymer and then separated by vacuum or pressure filtering, centrifugal filtering, gravity settling, or centrifugal settling. The carbon should be hard and abrasion resistant. The particles are suitably between about five-sixteenths in. and No. 400 mesh, U.S. Sieve Series, from about No. 5 mesh to about No. 50 mesh being preferred for a carbon bed, and smaller particles than No. 50 mesh being preferred when the slurry method is used. The desired particle size depends somewhat upon the apparent viscosity of the aqueous dispersion; a more viscous product requires the use of larger carbon particles in a bed, because of the pressure drop. The capacity for adsorbed materials, as well as selectivity for given impurities as against materials desirably left in the dispersion such as emulsifiers and dispersants, and as against water are in part dependent upon surface area, pore size, water wettability, total pore volume, and surface polarity or degree of oxidation of the surface. Generally, the physically hard "liquid phase carbons" adapted for aqueous systems which have the desired physical strength, and adsorption capacity, are useful. Suitable materials may have a total surface area of from 750 to 2000 square meters per gram, having three classes of pores in a given particle, large ones greater than about 1000 angstroms in diameter, and medium sized pores between 50 and 1000 angstroms in diameter, which interconnect smaller pores being less than 50 angstroms in diameter. A particularly useful activated or adsorbent carbon is petroleum coke prepared by the destructive distillation of petroleum materials having a similar total surface area, and having a large proportion, 50 to 80%, of the pores in the size range of 10 to 40 angstroms, preferably 20 to 30 angstroms, in diameter. Another type is coconut shell charcoal. As has been intimated above, passing a sample of the dispersion at the specified temperature through a laboratory size column of the carbon readily establishes whether or not a given carbon will coagulate the dispersion. Commercially available coconut shell and petroleum derived carbons which have been found to be particularly useful are "Witco 517" and "Witco 718" (Witco Chemical Company, Inc., 277 Park Ave., N.Y., N.Y.), "Columbia" grades TS570, LC, and CXC (Union Carbide Corporation, 270 Park Ave., N.Y., N.Y.), type "GI" (Barneby Cheney, N. Cassady at E. 8th Ave., Columbus, Ohio), and "PCB" (Pittsburgh Activated Carbon Company, Box 1346, Pittsburgh, Pa.).

As has been stated above, any stable aqueous dispersion of a water insoluble vinyl polymer may be purified by the method of the invention. The term "vinyl polymer" as used herein means a polymer prepared from monomers comprising at least one of the following groups:

| vinylidene | $CH_2=C<$, |
| vinyl | $CH_2=CH-$, and |
| vinylene | $-CH=CH-$, | whether homopolymerizable or not. Examples are the $\alpha,\beta$-ethylenically unsaturated monocarboxylic acids and esters and amides thereof, $\alpha,\beta$-ethylenically unsaturated aldehydes, $\alpha,\beta$-ethylenically unsaturated dicarboxylic acids and esters, amides, half esters, and half amides thereof, $\alpha,\beta$-ethylenially unsaturated nitriles, hydrocarbons such as $\alpha$-olefins, conjugated diolefins, vinylaryl compounds, vinyl alkyl ethers, vinyl halides, vinylidene halides, vinyl sulfides, vinyl acyloxy compounds (esters of saturated carboxylic acids and ethylenically unsaturated alkanols), vinyl amines and salts thereof, vinyl ureido monomers, vinyl compounds having heterocyclic nitrogen-containing (HN<)groups, and halogen, hydroxyalkyl, or aminoalkyl substituted derivatives thereof, whether homopolymers or copolymers. The aqueous dispersions of vinyl polymers and methods for their preparation form no part of the present invention, and any such polymer may be treated in accordance with the present invention. For examples of well known vinyl polymers and methods of preparing the same, see "Polymer Processes," Schildknecht, Interscience, N.Y. (1956), pp. 111-174. Mixtures of different polymer dispersions are useful, as are aqueous dispersions prepared by first polymerizing in solution or suspension in an organic solvent, then dispersing the material in an aqueous medium.

Specific examples of suitable monomers which may be homopolymerized or copolymerized to obtain water insoluble polymers for treatment according to the invention are acrylic acid, methacrylic acid, itaconic acid, maleic acid, phthalic acid, esters and half esters thereof with alkanols having 1 to 20 carbon atoms, such as methanol, ethanol, butanol, pentadecanol and the like, and amides and half amides thereof with ammonia or organic amines, acrolein, methacrolein, ethylene, propylene, isobutene, butadiene, isoprene, chloroprene, styrene, vinyltoluene, vinyl methyl ether, vinyl isobutyl ether, vinyl chloride, vinyl bromide, vinylidene chloride, vinyl sulfide, vinyl acetate, vinyl propionate, the vinyl pyridines, primary amino compounds such as $\beta$-aminoethyl vinyl ether, aminopentyl vinyl ether, secondary amino-containing compounds such as secondary amyl t-butyl aminoethyl methacrylate, tertiary amino-containing compounds such as t-dimethylaminoethyl methacrylate, and the allied amine salts such as the chloride or hydroxide, ureido monomers such as are discosed in U.S. Pat. Nos. 2,881,155 to Hankins, 3,300,429 to Glavis and Keighly, and 3,356,627 to Scott, examples being $\beta$-ureidoethyl acrylate, $\beta$-(N,N'-ethyleneureido) ethyl acid maleate, $\beta$-ureidoethyl vinyl ether, N-vinyl-N,N'ethyleneurea, N-vinyloxyethyl-N,N'-ethyleneurea, N-methacrylamidomethyl-N,N'-ethyleneurea, and N-dimethylaminoethyl-N'vinyl-N,N'-ethyleneurea, $\beta$-hydroxymethyl methacrylate, N-hydroxyethylacrylamide, N-methylolacrylamide, and N-(dimethylaminoethyl)acrylamide. Homopolymers, copolymers, and graft, block, or segmented polymers are included. Conventional methods of obtaining the aqueous dispersions are utilized.

Important steps and conditions to be observed in carrying out the process include prewetting and degassing the porous active carbon granules with water, and subjecting the dispersion to contact with the carbon while the dispersion is at a temperature above the $T_g$ of the polymer as it exists in the dispersion and within the temperature range at which the dispersed polymer is rubbery or may even be semi-liquid. This latter requirement is surprising, since at above the $T_g$ of the dispersed polymer particles they are prone to adherence to one another, i.e., they are sticky.

Polymer emulsions often contain residual oxidizing agents. These may be residues from the polymerization initiator or catalyst used in the polymerization or used as a "chaser" to initiate polymerization of left over vinyl monomers after the major polymerization steps have slowed or ceased. Residual oxidants may also result from the reaction of the initiator, or oxygen from the air, with other species present in the system. Dissolved oxygen itself may be such a residual oxidant.

It has now been found that the presence of residual oxidizing agents is undesirable since it may lead to reduced effectiveness of the carbon. Testing for residual oxidants is easy so an effective procedure to avoid impairment of the carbon is to test for and if necessary reduce the residual oxidant content. The test is performed as follows:

Four milliliters of ethanol, followed by two milliliters of the polymer dispersion, acidulated by the addition of concentrated hydrochloric acid if it has a pH above 4, are charged into a 13 mm. by 100 mm. test tube. The system is stirred, during which action flocculation of the dispersion may occur. One milliliter of a 20 weight percent aqueous solution of potassium thiocyanate, reagent grade, is added followed by 1 milliliter of 0.5 weight percent aqueous ferrous sulfate pentahydrate, reagent grade. The test tube is stoppered with a cork and centrifuged for about 2.5 minutes at full speed in a bench top laboratory centrifuge (International Clinical Centrifuge Model CL or equivalent). A prepared blank, using water in place of the polymer dispersion, is centrifuged at the same time. Immediately after centrifugation the tubes are assessed for the development of a pink-red color. Color in the dispersion test tube in excess of that in the blank indicates residual oxidant in the dispersion.

Should the polymer dispersion contain residual oxidant, reduction is readily accomplished by the addition of sodium hydrosulfite, solid or as an aqueous solution, with agitation. The reducing treatment is repeated, if necessary, until the test for residual oxidizing agent is negative. Reducing agents other than sodium hydrosulfite may also be used.

Should a carbon sample become oxidized it too may be reduced by treatment with sodium hydrosulfite or other reducing agents such as the various metal-acid combinations commonly used to produce hydrogen.

It is occasionally preferred that protective colloids be used, which colloids are preferentially adsorbed on the polymer particles as against adsorption on the carbon. Examples of such protective colloids are polyvinyl alcohol, hydroxyethyl cellulose, carboxymethyl cellulose, ammonium salts of styrene maleic anhydride copolymers or half amides thereof and polymethyl vinyl ether.

The pressure on the dispersion is preferably above the vapor pressure of volatiles in the dispersion, i.e., in the case of a fixed bed of carbon, the dispersion is fed thereto at superatmospheric pressure, such pressure being maintained within the column. Such column may be provided with a heating jacket if desired.

Another aspect of the invention is the recovery of adsorbed monomer from the active carbon, where practicable, and the revivification of the carbon when its adsorption capacity is neared. One simple and highly successful method of doing so, particularly in cases when the adsorbed impurities include saturated and unsaturated esters such as methyl propionate, methyl methacrylate, butyl acrylate, ethyl acrylate and the like or unsaturated acids such as acrylic, methacrylic, itaconic, or maleic acids, is to flood the carbon with a strong aqueous alkali such as sodium hydroxide. A suitable range of concentration in the solution is 0.1–10% of caustic soda, by weight. It is preferably heated, to nearly 100° C., or higher if pressure is used. The caustic wash is followed by a water wash, a dilute acid rinse and another water wash. This step may be followed by passing steam at 100°–200° C. through the carbon, although the steam treatment may precede the caustic treatment, or not be used at all in some cases. In the case of a polymerization in which the extent of conversion of monomers to polymer is substantially less than 100%, it may be desirable to treat the dispersion to recover monomer, as by flashing the dispersion or by various normal distillation techniques, prior to the contact with active carbon. In some instances, it is possible to recover monomers and other materials from the carbon during revivification. Other revivification procedures employ steps in which the carbon is flooded with an organic solvent system or a solution of organic solvents in water followed by water washing.

The pH of the dispersions is normally below 7, although an alkaline pH gives comparable results for alkali insoluble materials. The temperature of the slurry may be the ambient or room temperature, 20° C. to 30° C., but higher temperatures, up to about 95° C., or even higher at elevated pressures, are useful as are lower temperatures. At higher temperatures, migration of residual monomer to the surface of the polymer particle is faster. On the other hand, in some cases, thermal desorption of materials adsorbed on the active carbon may occur, although this may be overcome by maintaining adequate pressure on the system.

The dispersions may contain nonionic or ionic surface active agents, or both, although in some cases no dispersant need be present.

The time of contact between the active carbon and the aqueous dispersion is important. From 10 seconds to 5 hours or more are useful, from about 1 minute to about one hour being satisfactory in most cases.

Unless otherwise stated, all parts and percentages stated herein are by weight.

The following examples are illustrative of the invention.

EXAMPLE 1

An aqueous dispersion of a copolymer of ethyl arcylate, methyl methacrylate and itaconic acid, in a weight ratio of 80/18/2, prepared by a conventional emulsion polymerization procedure, containing 50% of solids by weight and having an average particle size of about 0.3 microns and neutralized to a pH of 6.5 with NaOH, is passed through a water-wet, degassed fixed bed of activated petroleum coke at 25° C., the color having a particle size of No. 20–40 mesh, a total surface area of 1150 m²/g., a total pore volume of 0.66 cc/g., and having approximately 54% of the pore volume as pores having a diameter of 10 to 40 angstrom units, the coke being grannular. The dispersion is much improved in odor, the pH is 6.5, and gas chromatography analysis of the dispersion before and after the treatment demonstrates a large reduction in volatile materials. Similar results are obtained at 50° C., the polymer particles having a $T_g$ of below 20° C. Coatings prepared from the two treated dispersions show much improved odor and better color stability.

EXAMPLE 2

When the carbon of Example 1 drops in efficiency, three samples are subjected to different revivifying treatments. In the first, the material is washed with hot aqueous sodium hydroxide (at or above 80° C. and up to the boiling point at the pressure used) having a concentration of 4%, followed by water washing, and washing with a dilute acid (0.5% $H_2SO_4$) rinse, and another water rinse, then by passing steam at a pressure of 25 lbs. gauge pressure therethrough. The second and third samples are similarly treated, but with only a steam treatment or only the caustic treatment. After treatment the first and third samples show a greater capacity for adsorbing impurities than does the second sample although all were considerably revivified. Similar results are obtained with superheated steam at 150° C. In large part, the impurities are saturated and unsaturated esters.

EXAMPLE 3

An aqueous dispersion of solid (but heated to above the $T_g$) particles having a solids content of about 45% of a copolymer of ethyl acrlate, itaconic cid, and vinylidene chloride, in a weight ratio of 10/2/88 respectively, and the particles in the dispersion having a $T_g$ of below 20° C. prepared by a conventional emulsion polymerization procedure, is subjected to treatments similar to Example 1 at 25° C. or 50° C., but with the coke having been prepared from similar coke fines bonded together. The mesh size of the petroleum coke as used in treating the dispersion is from No. 12 to No. 30, and the total surface area being over 1000 m²/g. When subjected to analysis and odor tests as in Example 1, the product is shown to be substantially pure as regards odor and objectionable volatile materials, and the stability of the color of films, formed from the dispersions, is improved.

EXAMPLE 4

Example 1 is repeated, but substituting an acrylic polymer having a $T_g$ of about 50° C., and the dispersion is maintained at about 80° C. while being passed through the column of carbon, with excellent results.

EXAMPLE 5

While the invention is of major importance in the treatment of dispersions of solid particles of acrylic polymers, it is also applicable to polymers containing a high proportion of polymerized $\alpha,\beta$-ethylenically unsaturated carboxylic acids, which may be highly water swollen. As is used herein, the term "polymer dispersed in an aqueous medium" is intended to embrace such colloid-like dispersions. Repeating Example 1 with an aqueous copolymer dispersion at 40° C. and containing 20% of a copolymer of 25% of methacrylic acid and 75% of ethyl acrylate at a pH of about 3 gives a product much improved in odor and practically devoid of objectionable volatile organic materials as evidenced by gas chromatography.

EXAMPLE 6

When Example 5 is repeated at room temperature (25° C.), at 40° C. and at 50° C. with a polymer dispersion, at 20% solids, of a similar polymer derived from 60% methacrylic acid and 40of ethyl acrylate, similar results are obtained.

EXAMPLE 7

An aqueous dispersion, 45% solids, prepared by conventional emulsion polymerization from 95% ethyl acrylate, 1% acrylamide, and 4% N-methyl acrylamide, when treated at room temperature and at 50° C. in accordance with the procedure of Example 3 or with coconut shell charcoal is similarly improved.

EXAMPLE 8

An emulsion polymerized aqueous dispersion containing 46% solids prepared from 60% ethyl acrylate, 38% of methyl methacrylate, and 1% each of ureidomethyl methacrylate and methacrylic acid brought to a pH of 9.5 with ammonia is purified by the method of Example 3, at room temperature (25° C.) with excellent results. Similar samples at pH values 7.0 and 3.2 were treated with excellent results.

EXAMPLE 9

Conventional emulsion polymerization is used to prepare a copolymer of 50% butyl acrylate, 49% butyl methacrylate and 1% acrylic acid, the dispersion having 58% solids by weight. Passing the dispersion maintained at 50° C. through the column of petroleum coke of Example 1 provides an odor-free dispersion containing only a minute amount of organic volatile material.

EXAMPLE 10

An aqueous dispersion of solid polymeric particles, having a solids content of about 50%, prepared from 80% ethyl acrylate, 16% methyl methacrylate, and 4% itaconic acid by conventional emulsion polymerization using sodium persulfate initiator, is markedly reduced in volatile materials as evidence by gas chromatography and has practically no odor after having been treated by the method of Example 1, at temperatures of 25° C. and 50° C. In this and the preceding examples, the $T_g$ of the dispersed polymer particles is well below the temperature at which the dispersion is maintained.

EXAMPLE 11

Repeating the foregoing examples, but slurrying the dispersions with the active carbon, then promptly filtering the carbon from the dispersion, gives similar results.

EXAMPLE 12

The method of the invention, when combined with other purification procedures, is also useful. Thus, when preceded by vacuum stripping, contact with ion exchange or organic adsorbent beads such as Amberlite XAD-2, or the use of a chaser catalyst such as tertiary butyl hydroperoxide for unreacted monomer, treatment of the thus partially purified dispersion in accordance with the method of Example 1 gives excellent results.

In each of the above examples, the temperature of the dispersion is maintained at above the $T_g$ of the dispersed polymer particles.

We claim:

1. A method of purifying a solid particulate addition polymer prepared from monomers having at least one ethylenically unsaturated structure selected from the group of structures consisting of $CH_2=C<$, $CH_2=CH-$, and $-CH=CH-$ in the form of an aqueous dispersion prepared by emulsion polymerization, the dispersion being contaminated with low molecular weight impurities, comprising the steps of contacting said aqueous dispersion with adsorbent carbon, the temperature of the dispersion being above the Tg of the dispersed polymer, the adsorbent carbon being between about five-sixteenths of an inch and 400 mesh, U.S. Sieve Series, in size, and separating said aqueous dispersion and said carbon.

2. The method of claim 1 in which said dispersion is passed through a bed of said carbon in the form of granules.

3. The method of claim 1 in which said contact is made by slurrying said carbon in said dispersion.

4. A method of purifying a solid particulate polymer prepared from monomers having at least one ethylenically unsaturated structure selected from the group of structures consisting of $CH_2=C<$, $CH_2=CH-$, and $-CH=CH-$ in the form of an aqueous dispersion prepared by emulsion polymerization, the dispersion being contaminated with low molecular weight impurities, comprising the steps of (1) treating the dispersion with a reducing agent, (2) contacting the dispersion with an adsorbent carbon, the temperature of the dispersion being above the Tg of the dispersed polymer, the adsorbent carbon being between about five-sixteenths of an inch and 400 mesh, U.S. Sieve Series in size, and (3) separating said aqueous dispersion and said carbon.

5. A method of purifying an aqueous dispersion of a solid particulate acrylic polymer prepared by emulsion polymerization and contaminated with low molecular weight impurities, comprising the steps of contacting said aqueous dispersion with petroleum coke or coconut shell charcoal, the temperature of the dispersion being above the Tg of the dispersed polymer, the petroleum coke and coconut shell charcoal being between about five-sixteenths of an inch and 400 mesh, U.S. Sieve Series, in size, and separating said aqueous dispersion and said coke or charcoal.

6. The method of claim 1 in which said polymer is acrylic polymer.

7. The method of claim 6 in which said carbon is petroleum coke or coconut shell charcoal.

8. The method of claim 7 in which said carbon is petroleum coke.

9. The method of claim 7 in which said carbon is coconut shell charcoal.

10. The method of claim 7 in which said polymer is a polymer of at least one of an alkyl acrylate, an alkyl methacrylate, alkyl methacrylate with an addition-polymerizable $\alpha,\beta$-ethylenically unsaturated carboxylic acid and a vinyl aromatic hydrocarbon.

* * * * *

UNITED STATES PATENT OFFICE
CERTIFICATE OF CORRECTION

Patent No. 3,944,513            Dated March 16, 1976

Inventor(s) Harold L. Greenwald, Benjamin B. Kine

It is certified that error appears in the above-identified patent and that said Letters Patent are hereby corrected as shown below:

Col. 3, line 6, "The" should be --Any--.

Col. 7, line 1, "color" should be --coke--.

Col. 7, line 37, "acrlate" should be --acrylate--.

" 37, "cid" should be --acid--.

Col. 8, line 11, "40of" should be --40%--.

Col. 8, line 17, "N-methyl" should be --N-methylol--.

Signed and Sealed this

Tenth Day of August 1976

[SEAL]

Attest:

RUTH C. MASON
Attesting Officer

C. MARSHALL DANN
Commissioner of Patents and Trademarks